United States Patent [19]
Suzuki

[11] Patent Number: 5,953,369
[45] Date of Patent: Sep. 14, 1999

[54] DS-CDMA RECEIVER WITH MULTI-STAGE SERIAL INTERFERENCE CANCELERS USING POWER LEVEL INFORMATION APPENDED TO DATA BLOCKS

[75] Inventor: Hideto Suzuki, Tokyo, Japan

[73] Assignee: NEC Corporation, Japan

[21] Appl. No.: 08/872,604

[22] Filed: Jun. 10, 1997

[30] Foreign Application Priority Data

Jun. 10, 1996 [JP] Japan .................................... 8-146932

[51] Int. Cl.⁶ ............................. H04B 15/00; H04B 1/10; H04B 7/216
[52] U.S. Cl. ........................... 375/206; 375/346; 370/342
[58] Field of Search .................................. 375/206, 200, 375/207, 346; 370/342, 335, 441, 389, 241, 320, 350, 474, 479, 286, 252; 455/42.7, 12.1, 63.3, 69, 103

[56] References Cited

U.S. PATENT DOCUMENTS

5,757,791   5/1998   Kanterakis et al. ..................... 375/206

FOREIGN PATENT DOCUMENTS

0776105    5/1997   European Pat. Off. ......... H04J 13/04
62-104243  5/1987   Japan .

OTHER PUBLICATIONS

J. Sawahashi, et al., "Serial Canceler Using Recursive Channel Estimation By Pilot Symbols for DS–CDMA", Institute of Electronics, Information and Communication Engineers (Japan), Technical Report, SAT 95–14, RCS95–50 (1995–07).

Sawahashi, M. et al., *Electronics Letters*, "Pilot Symbol–Assisted Coherent Multistage Interference Cancellar Using Recursive Channel Estimation for DS–CDMA Mobile Radio," vol. 32, No. 4, Feb. 15, 1996, pp. 301–302.

*Primary Examiner*—Stephen Chin
*Assistant Examiner*—Albert Park

[57] ABSTRACT

A direct-sequence CDMA receiver comprises power detectors for receiving a spread spectrum signal for detecting the power levels of user channels. A channel ranking circuit determines the ranks of the power levels. A framing circuit segments the received spread spectrum signal into data blocks and appending, to each of the data blocks, a header containing channel numbers identifying the user channels arranged according to the determined power level ranks. A plurality of serial interference cancellation stages are provided, each including interference cancelers arranged in descending order of ranks. Each interference canceller detects one of the channel numbers of the header corresponding to the rank of the interference canceler, and removes one or more interfering signals from an associated user channel by using a despreading code that corresponds to the detected channel number.

10 Claims, 5 Drawing Sheets

DS-CDMA RECEIVER WITH MULTI-STAGE SERIAL INTERFERENCE CANCELERS USING POWER LEVEL INFORMATION APPENDED TO DATA BLOCKS

BACKGROUND OF THE INVENTION

1. Field of the Invention

The present invention relates generally to direct sequence spread spectrum communication systems, and more specifically to a multi-stage serial interference cancellation direct sequence CDMA (code division multiple access) receiver.

2. Description of the Related Art

As described in "Serial Canceler Using Recursive Channel Estimation By Pilot Symbols for DS-CDMA", M. Sawahashi et al, Institute of Electronics, Information and Communication Engineers (Japan), Technical Report, SAT 95-14, RCS95-50 (1995-07), a multi-stage serial canceler uses recursive channel estimation to estimate replicas of interference from other user channels using despreading codes. The estimated replicas are iteratively summed and combined with time-coincident channel signals in each cancellation stage. The power levels of user channels are detected and their ranking determined. The ranking information is then stored in a store-and-shift circuit where it is shifted along as cancellation proceeds from one stage to the next. The ranking information is supplied to the interference cancelers of each stage to allow them to select appropriate despreading codes. Since the store-and-shift circuit is required to hold users' timing and power level information, a significant amount of memory and complex control circuitry are required for precisely feeding the stored information to all cancellation stages. If the number of user channels and/or the number of cancellation stages increase, the central control circuitry would become considerably complex.

SUMMARY OF THE INVENTION

It is therefore an object of the present invention to provide a multi-stage serial interference canceler for direct sequence CDMA receiver which is simplified and requires less memory.

According to a first aspect of the present invention, there is provided a direct-sequence code division multiple access receiver comprising a plurality of power detectors for receiving a spread spectrum signal from a plurality of user channels, and detecting the power levels of the user channels. A channel ranking circuit determines the ranks of the power levels. A framing circuit is provided for segmenting the received spread spectrum signal into data blocks and appending, to each of the data blocks, a header containing channel numbers identifying the user channels arranged according to the determined ranks. A plurality of serial interference cancellation stages are provided, each including a plurality of interference cancelers arranged in descending order of ranks. Each interference canceller detects one of the channel numbers of the header corresponding to the rank of the interference canceler, and removes one or more interfering signals from an associated user channel by using a despreading code corresponding to the detected channel number.

According to a second aspect, the present invention provides a direct-sequence code division multiple access receiver comprising a framing circuit for receiving a spread spectrum signal from a plurality of user channels, and segmenting the received spread spectrum signal into data blocks, and a plurality of power detectors connected in series from the framing circuit for determining the power levels of the user channels, and appending a header to each of the data blocks containing indications of the power levels arranged in a predetermined order of the user channels. A plurality of serial interference cancellation stages are provided, each including a plurality of interference cancellers arranged in descending order of ranks. Each of the interference cancellers detects one of the power level indications of the header corresponding to the rank of the interference canceler and detects one of the channel numbers corresponding to the detected power level indication, and removes one or more interfering signals from an associated user channel by using a despreading code that corresponds to the detected channel number.

BRIEF DESCRIPTION OF THE DRAWINGS

The present invention will be described in further detail with reference to the accompanying drawings, in which.

DETAILED DESCRIPTION

Figure 1:
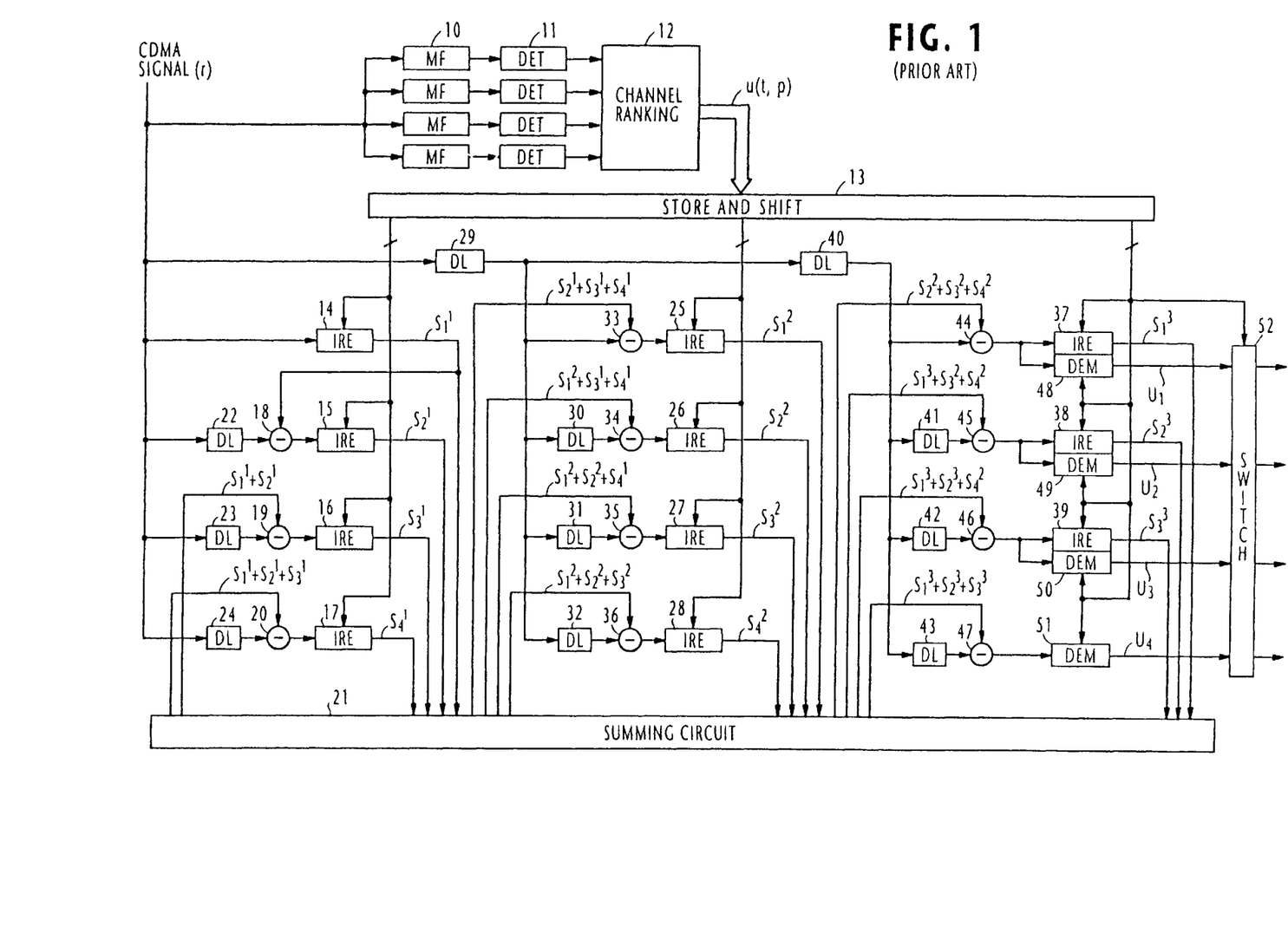
FIG. 1 is a block diagram of a prior art DS-CDMA receiver using a serial interference canceler.

Before proceeding with the detailed description of the present invention, it may prove helpful to provide an explanation of the prior art with reference to the block diagram shown in FIG. 1. It is assumed that the prior art direct-sequence CDMA (code division multiple access) receiver with a serial interference canceler accommodates four user channels and includes three interference cancellation stages.

The receiver includes matched filters 10 respectively corresponding to the user channels, the matched filters being connected together to receive a direct sequence CDMA signal for detecting the user channels, using respective despreading codes. The individual power levels of the user channels are detected by power detectors 11 and fed to a channel ranking circuit 12, where they are compared to determine their relative power levels. A ranking signal u(t, p) is produced for each user channel, where t and p represent the timing information and the power level, respectively, of the incoming signal. The output of channel ranking circuit 12 is stored in a store-and-shift circuit 13 and shifted along to the right, while at the same time, delivered to a plurality of interference replica estimators (IREs) of each of three successive cancellation stages.

Each IRE provides channel estimation using a plurality of matched filters, RAKE-combining the matched filter outputs, making a threshold decision on the combined data, and re-spreading the decision data, using despreading codes specified by the ranking signals from the store-and-shift circuit 13. In each cancellation stage, IREs and its associated subtractors form interference cancelers and are connected to process delayed channel signals in descending order of power levels.

In the first cancellation stage, the ranking signal supplied to IRE 14 indicates the highest of all the detected power levels, and the ranking signal supplied to IRE 15 indicates the second highest, and so forth, so that the ranking signal supplied to IRE 17 indicates the lowest of the detected power levels. A DS-CDMA input signal is first applied to IRE 14 to estimate an interference replica $S_1^1$. This input signal is delayed by delay elements 22, 23 and 24 by different amounts so that their outputs are respectively time-coincident with iteratively summed interference replicas with which they are combined at the inputs of IREs 15, 16 and 17, which produce interference replicas $S_2^1, S_3^1$, and $S_4^1$, respectively. The estimated replicas from IREs 14 to 17 are supplied to a summing circuit 21, where they are iteratively summed. More specifically, interference replica $S_1^1$ from IRE 14 is canceled by subtractor 18 from the input of IRE 15, and a replica sum $S_1^1+S_1^2$ is canceled from the input of IRE 15 by a subtractor 19, and a replica sum $S_1^1+S_1^2+S_1^3$ are canceled by subtractor 20 from the input of IRE 17 which produces a replica $S_1^4$.

Delay elements 20 and 40 form a tapped delay line and the CDMA channel input to the second and third cancellation stages are supplied from taps of this delay line.

For processing signals in the second cancellation stage, the ranking signals previously used for the first stage are shifted in the store-and-shift circuit 13 and applied to IREs 25, 26, 27 and 28. Delay elements 29, 30, 31 and 32 correspond to delay elements 22, 23, 24 of the first stage. Interference replicas $S_1^2, S_2^2, S_3^2$ and $S_4^2$ are produced by IREs 25, 26, 27 and 28 and iteratively summed in summing circuit 21 and canceled by subtractors 33, 34, 35 and 36 from time-coincident channel inputs of IREs 25 to 28. Events similar to the second stage occur in the third cancellation stage. The ranking signals previously used in the second stage are now shifted to the third stage in the store-and-shift circuit 13 and applied to IREs 37, 38 and 39 for processing outputs of subtractors 44, 45, 46, 47 which combine outputs of delay elements 40, 41, 42 and 43 with iteratively summed replicas from summing circuit 21 as illustrated in FIG. 1.

Interference-canceled channel signals are respectively supplied from subtractors 44, 45, 46, 47 to demodulators 48, 49, 50, 51 where the user channel signals $U_1, U_2, U_3$ and $U_4$ are recovered, using respective despreading codes specified by the store-and-shift circuit 13.

The location of user channels in each cancellation stage vary from one IRE to another depending on their relative signal strength. To establish the constant identity of user channels, a switch 52 responds to the ranking signal by switching the outputs of demodulators 48 to 51 to appropriate output terminals.

Since the store-and-shift circuit 13 is required to hold users' timing and power level information and shift it with time as cancellation proceeds from one stage to the next, a significant amount of memory is needed and complex control circuitry is required for precisely feeding the stored information to all cancellation stages. If the number of user channels and/or the number of cancellation stages increase, the control circuitry would become considerably complex.

In order to overcome the prior art problems, the present invention segments an incoming CDMA signal into time-compressed data blocks and appends a header to each data block. According to a first embodiment of this invention, the header contains user channel numbers arranged in descending order of power level.

Figure 2:
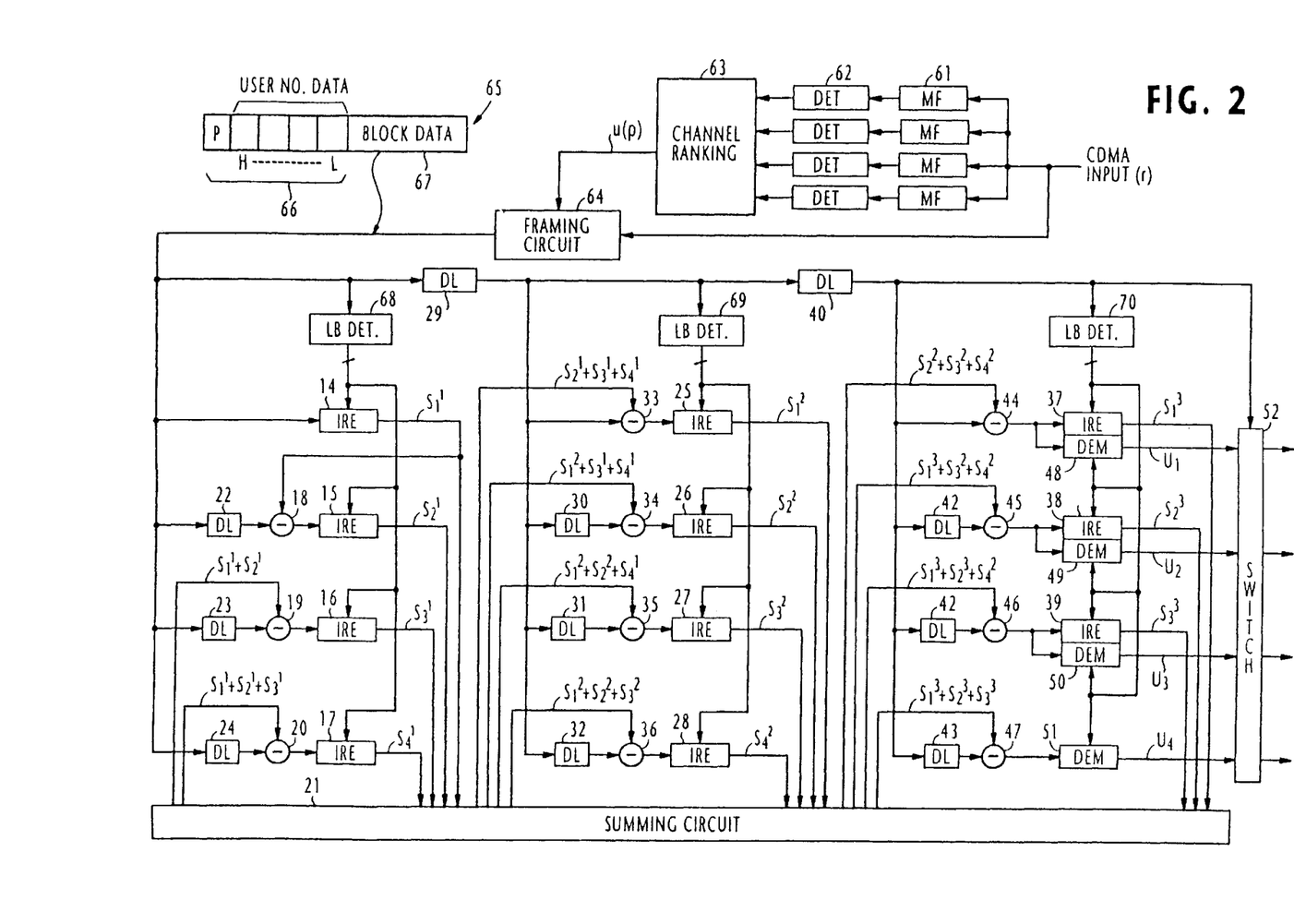
FIG. 2 is a block diagram of a DS-CDMA receiver using the prior art serial interference canceler according to a first embodiment of the present invention.

Referring to FIG. 2, a DS-CDMA receiver of the first embodiment of the present invention produces a header that contains user channel numbers arranged in descending order of their signal strengths. In FIG. 2, parts corresponding in significance to those of FIG. 1 are marked with the same numerals as those in FIG. 1.

In FIG. 2, a direct-sequence spread spectrum (DS-CDMA) input signal is fed to a plurality of matched filters 61 which are associated respectively with the user channels. In each matched filter, a user channel signal is detected using a corresponding despreading code. The power levels of the user channels are detected from the matched-filter outputs by power detectors 62. A channel ranking circuit 63 compares the power levels with each other and produces a signal u(p) containing indications of the power ranking of user channels and the channel numbers. A label insertion and framing circuit (simply, framing circuit) 64 is connected to the output of the ranking circuit 63. Framing circuit 64 receives the DS-CDMA input signal, segments it into time-compressed successive data blocks and encapsulates each data block into the payload field 67 of a frame 65. Framing circuit 64 inserts the ranking indications into the header field 66 of the frame. The header information comprises a preamble having a particular bit pattern followed by a series of user channel numbers arranged in descending order of the ranks. Therefore, a user transmitting the strongest signal appears first in the frame header and a user transmitting the weakest signal appears in the last position.

Label (header) detectors 68, 69 and 70 are connected to respective taps of the delay line formed by delay elements 29 and 40, corresponding respectively to the first, second and third cancellation stages. Each of these label detectors compares a preamble with a predetermined bit pattern to recognize the starting point of a frame header. The label detector then proceeds to examine the user channel numbers that follow and produces a set of command signals to specify particular despreading codes to be used by the IREs of the associated cancellation stage. The frame signal 65 is first applied to label detector 68 to assign user channels of descending order of power levels to IREs 14 to 17, with the channel assigned to IRE 14 being the strongest and the channel assigned to IRE 17 being the weakest. The delayed frame is applied to label detector 69 which commands IREs 25 to 28 and the further delayed frame is applied to label detector 70 which commands IREs 37 to 39.

The header information supplied from delay element 40 is also used by switch 52 for switching the outputs of demodulators 48 to 51 to output terminals of the final cancellation stage. Whenever there is a change in the relative power levels, the frame header is updated and the label detector 68 senses this change and re-configures the channel assignment of the first stage. This reconfiguration is followed by the second and third stages as the updated header propagates through label detectors 69 and 70. Using the header information, switch 52 identifies which outputs of demodulators 48–51 are to be delivered to the output terminals, so that the outputs of the third cancellation stage are always connected to appropriate terminals regardless of the reconfiguration of each cancellation stage.

It is seen that the channel assignment function is distributed among the segmented data blocks. No complex control circuitry is thus required.

All the delay elements of FIG. 2 are implemented with memories each holding one or more segmented data blocks of the CDMA spread spectrum signal. Since the total amount of delays to be introduced to CDMA signals increases significantly if the number of user channels increases, the total memories required will be of substantial volume if the system were to serve a large number of user channels.

Figure 3:
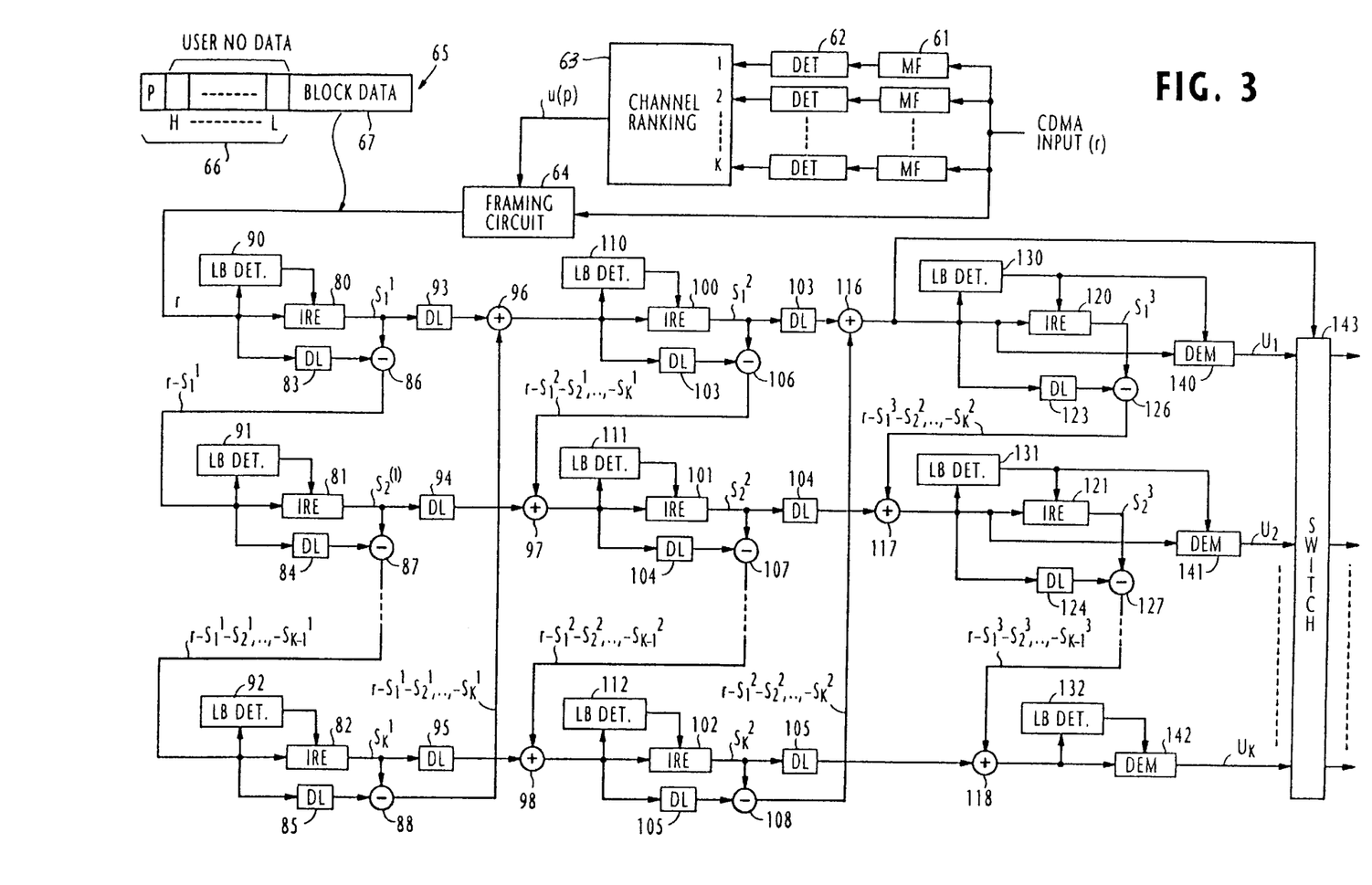
FIG. 3 is a block diagram of a DS-CDMA receiver using a modified serial interference canceler according to a second embodiment of the present invention.

A modification of the first embodiment is shown in FIG. 3, wherein parts corresponding in significance to those in FIG. 2 are marked with the same numerals. It is assumed that there are K user channels. The CDMA receiver of FIG. 3 differs from FIG. 2 in that the serial cancellation stages are simplified by reducing the total memory capacity necessary for implementing the delays.

In FIG. 3, the output of framing circuit 64 is supplied to an IRE 80, a delay element 83 and a label detector 90. Label detector 90 reads the user number data of a frame signal 65, selects one that appears first in the frame header following a preamble and commands IRE 80 to use a despreading code corresponding to the selected user channel to produce an interference replica $S_1^1$. The delay element 83 provides a delay to its input corresponding to the time necessary for estimating an interference replica from one data block. This delayed CDMA signal (r) is combined with the interference replica $S_1^1$ in a subtractor 86, producing an output signal $r-S_1^1$.

The signal $r-S_1^1$ is applied to an IRE 81, a delay element 84 and a label detector 91. Label detector 91 reads a user channel number that appears in the second position of the frame header and commands IRE 81 to produce an interference replica $S_2^1$ using a despreading code corresponding to the selected channel number. The interference replica $S_2^1$ is canceled by a subtractor 87 from the output of delay element 84, producing an output signal $r-S_1^1-S_2^1$.

This process continues until a signal $r-S_1^1-S_2^1, \ldots, -S_{K-1}^1$ is supplied to an IRE 82, a delay element 85 and a label detector 92. Label detector 92 reads a user number data that appears in the header's last position and commands IRE 82 to produce an interference replica $S_K^1$ using a despreading code corresponding to the channel of lowest strength. The interference replica $S_K^1$ is then canceled in a subtractor 88 from the output of delay element 85 to produce an output signal $r-S_1^1-S_2^1, \ldots, -S_K^1$.

Meanwhile, the output of IRE 80 is applied to a delay element 93 where it is delayed K-times the replica estimation time, so that it coincides with the output of subtractor 88. These time-coincident signals are summed together in an adder 96 to produce an output signal $r-S_2^1, \ldots, -S_K^1$.

In the second stage, the output of adder 96 is fed to an IRE 100, a delay element 101 and a label detector 102. Label detector 102 reads the first position user number from the frame header and commands IRE 100 to produce an interference replica $S_1^2$ using the same despreading code as that used previously by IRE 80 of the first stage. The interference replica $S_1^2$ is then canceled in a subtractor 106 from the output of delay element 103, producing an output signal $r-S_1^2-S_2^1, \ldots, -S_K^1$. It is seen that the first-stage replica component $S_1^1$ is now replaced with the second-stage replica component $S_1^2$.

Meanwhile, the output of IRE 81 is applied to a delay element 94 where it is delayed to time-coincide with the output of subtractor 106. These time-coincident signals are summed together in an adder 97 to produce an output signal $r-S_3^1, \ldots, -S_K^1$.

The output of adder 97 is fed to an IRE 101, a delay element 104 and a label detector 111. Label detector 111 reads the second position user channel number from the frame header and supplies a command signal to IRE 101 to produce an interference replica $S_2^2$ using the same despreading code as that used previously by IRE 81. The interference replica $S_2^2$ is then canceled in a subtractor 107 from the output of delay element 104, producing an output signal $r-S_1^2-S_2^2, \ldots, -S_K^1$. The first-stage replica component $S_2^1$ is now replaced with the second-stage replica component $S_2^2$.

The process continues until a signal $r-S_1^2-S_2^2, \ldots, -S_{K-1}^2$ is supplied to an adder 98 where it is summed with the replica $S_K^1$ from a delay element 95, removing the first-stage replica component $S_K^1$ from this signal. The output of adder 98 is supplied to an IRE 102, a delay element 105 and a label detector 102. Label detector 102 reads the last position user channel number from the frame header and supplies a command signal to IRE 102 to produce an interference replica $S_K^2$ using the despreading code of the weakest signal. The interference replica $S_K^2$ is then subtracted in a subtractor 108 from the output of delay element 105 to produce an output signal $r-S_1^2-S_2^2, \ldots, -S_K^2$.

Meanwhile, the output of IRE 100 is applied to a delay element 103 where it is delayed to coincide with the output of subtractor 108. These time-coincident signals are summed together in an adder 116 to produce an output signal $r-S_2^2, \ldots, -S_K^2$.

In the third stage, the output of adder 116 is received by an IRE 120, a delay element 121, a label detector 122 and a demodulator 140. Label detector 122 selects the first position user channel from the frame header and commands IRE 120 to produce an interference replica $S_1^3$ using the same despreading code as that previously used by IRE 100 in the second stage. The replica $S_1^3$ is then canceled in a subtractor 126 from the output of delay element 123, producing an output signal $r-S_1^3-S_2^3, \ldots, -S_K^3$. The second-stage component $S_1^2$ of the output of subtractor 108 is now replaced with the third-stage component $S_1^3$. The same command signal as that applied to IRE 120 is applied to demodulator 140 to recover the user signal $U_1$. The output of the second-stage IRE 101 is delayed by a delay element 104 to coincide with the output of the third-stage subtractor 126 and the time-coincident signals are summed together in an adder 117, producing an output signal $r-S_3^3, \ldots, -S_K^2$.

The output of adder 117 is fed to an IRE 121, a delay element 124, a label detector 131 and a demodulator 141. Label detector 131 read the second position user channel number and commands IRE 121 to produce an interference replica $S_2^3$ using the same despreading code as that previously used by IRE 101. The interference replica $S_2^3$ is then canceled in a subtractor 127 from the output of delay element 124, producing an output $r-S_1^3-S_2^3, \ldots, -S_K^2$. The second-stage replica $S_2^2$ is now replaced with the third-stage replica $S_2^3$. The same command signal as that applied to IRE 121 is used by demodulator 141 to recover the user signal $U_2$.

The process continues until a signal $r-S_1^3-S_2^3, \ldots, -S_{K-1}^3$ is supplied to an adder 118 where it is summed with the second-stage replica $S_K^2$ from the output of subtractor 127. The output of adder 118 is fed a label detector 132 and a demodulator 142. Label detector 132 selects the last-position user channel number and commands the demodulator 142 to recover the user signal $U_K$ using the same despreading code as that previously used by IRE 102.

The output of adder 116 is further coupled to a switch 143 for coupling the outputs of demodulators 140, 141, 142 to appropriate output terminals regardless of reconfiguration of channel assignment to each cancellation stage that results from the constantly varying relative strengths of user channels.

Since the volume of information contained in interference replicas is very small compared to channel signals, the amount of memories required to implement delay elements 93 to 95, 103 to 105 is insignificant. Although other delay elements such as 83 to 85 provide delays to the channel signals, the memories required to implement these elements are only needed to hold a single data block for a unit period for estimating an interference replica.

Figure 4A:
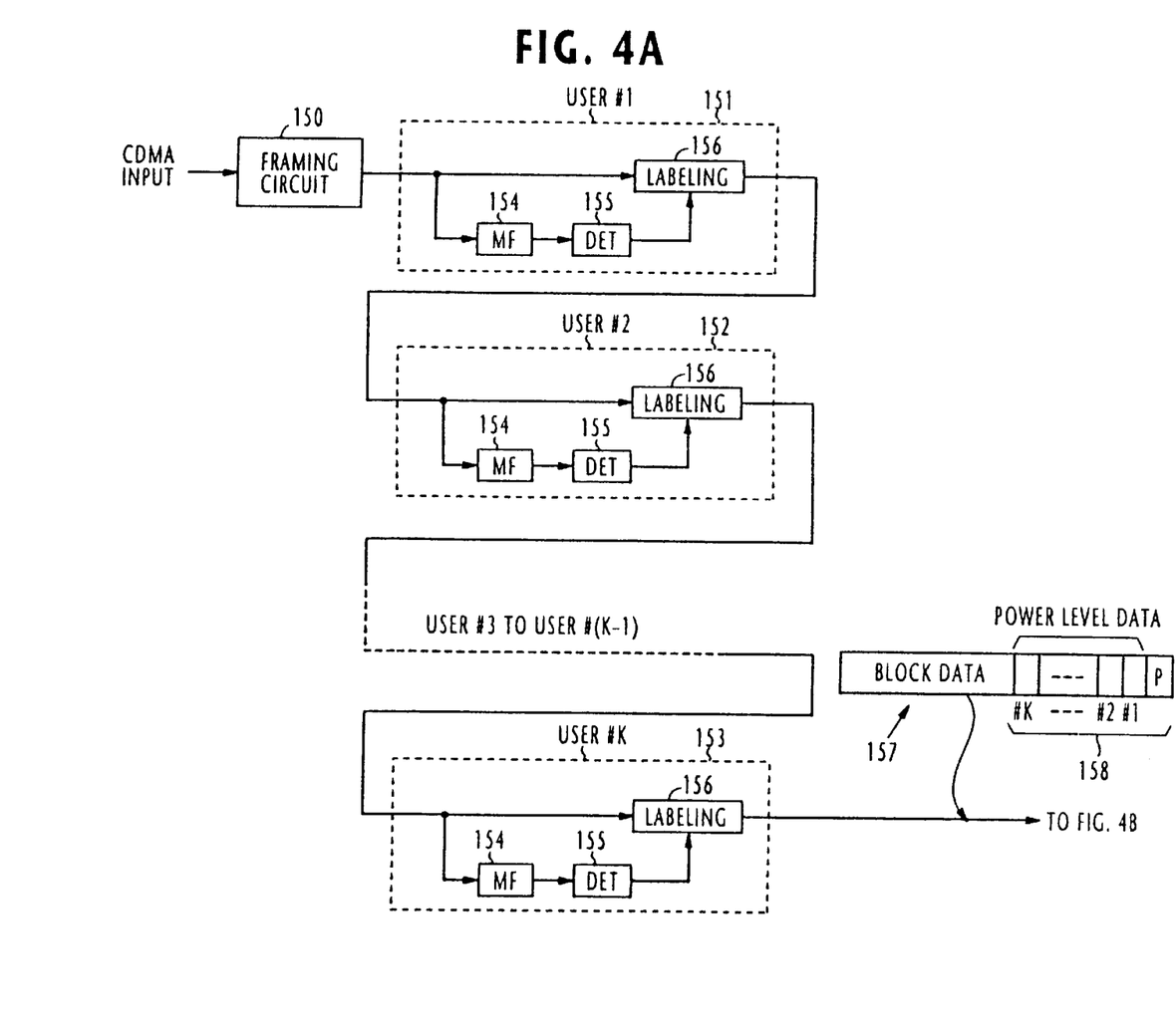
FIGS. 4A and 4B are block diagrams of a DS-CDMA receiver using a further modified serial interference canceler according to a third embodiment of the present invention.

According to a third embodiment of this invention, the frame header contains power level indications arranged in a predetermined order of user channel numbers. In FIG. 4A, a CDMA input signal is applied to a framing circuit 150 where it is time-compressed and segmented into a series of data blocks. Each data block is encapsulated into the payload field of a frame 157 preceded by a header 158 containing a preamble of a predetermined bit pattern.

To the output of the framing circuit 150 is connected a series of identical header insertion circuits 151, 152 and 153 which are associated respectively with user channels #1 through #K. Each header insertion circuit comprises a matched filter 154 and a power level detector 155 connected in series to the output of framing circuit 150. Power level detector 155 of each header insertion circuit produces an indication of the power level of the associated user channel. A labeling circuit 151 of each header insertion circuit receives a power level indication from detector 155 and inserts it into a position of the header which is associated with each user channel. Specifically, the power indications produced by the header insertion circuits 151, 152 and 153 are respectively inserted into the first, second and K-th positions of the header.

Figure 4B:
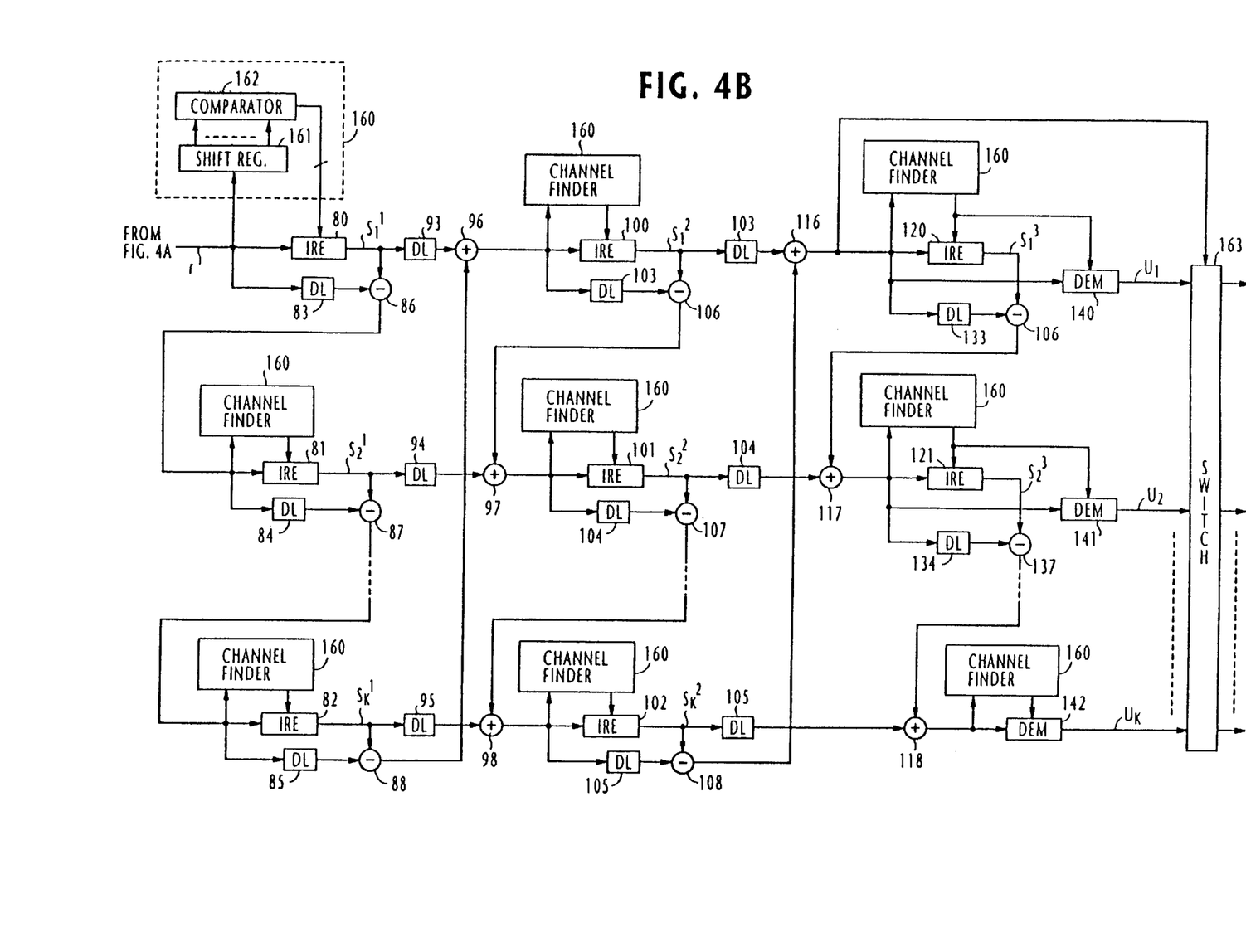

The output of header insertion circuit 153 is connected to the input of the first cancellation stage of FIG. 4B.

In FIG. 4B, wherein parts corresponding in significance to those in FIG. 3 are marked with the same numerals as those used in FIG. 3. The serial cancellation stages of FIG. 4B differs from the FIG. 3 embodiment by the provision of a plurality of channel finders 160 respectively connected to all IREs and demodulators.

Each channel finder is associated with a particular power level rank and determines which user channel number corresponds to the particular power level rank. It includes a shift register 161 and a comparator 162. The shift register 161 is supplied with all power level indications from a frame header, and comparator 162 determines their ranks and identifies one of the user channel numbers that corresponds to the particular power level rank of the channel finder. Comparator 162 supplies a command signal to the associated IRE to produce an interference replica using the despreading code of the identified user channel number.

Therefore, the comparator 162 that is associated with IRE 80 determines the power level indication of highest rank, identifies its corresponding user channel number and supplies IRE 80 with a command signal that specifies the despreading code of the identified user channel number.

The output of adder 116 is further coupled to a switch 163 for coupling the outputs of demodulators 140, 141, 142 to appropriate output terminals regardless of reconfiguration of channel assignment to each cancellation stage that results from the constantly varying relative strengths of user channels.

What is claimed is:

1. A direct-sequence code division multiple access receiver comprising:
    a plurality of power detectors for receiving a spread spectrum signal from a plurality of user channels, and determining therefrom power levels of the user channels;
    a channel ranking circuit for determining ranks of the power levels;
    framing means for segmenting the received spread spectrum signal into data blocks and appending, to each of the data blocks, a header containing channel numbers identifying said channels arranged according to said ranks; and
    a plurality of serial interference cancellation stages, each of the cancellation stages including a plurality of interference cancelers arranged in descending order of ranks, each of said interference cancellers detecting one of said channel numbers of said header corresponding to the rank of the interference canceler, and removing one or more interfering signals from an associated user channel by using a despreading code corresponding to the detected channel number.

2. A direct-sequence code division multiple access receiver as claimed in claim 1, wherein said channel numbers are arranged in descending order of said ranks.

3. A direct-sequence code division multiple access receiver as claimed in claim 1, further comprising a switch responsive to said header for connecting output signals of said cancellation stages to output terminals.

4. A direct-sequence code division multiple access receiver as claimed in claim 1, wherein each of said interference cancelers comprises:
    a header detector for producing a command signal from a header information;
    an interference replica estimator for estimating an interference replica from an input signal using a despreading code specified by said command signal;
    a delay element for delaying said input signal by an interval corresponding to the time taken to produce said interference replica; and
    a subtractor for combining the interference replica with the delayed input signal, the output of the subtractor being connected to a following interference canceler.

5. A direct-sequence code division multiple access receiver as claimed in claim 1, wherein said cancellation stages comprise:
    a plurality of first delay elements connected in series to form a tapped delay line for successively providing delays to an output signal from said framing means;
    a plurality of header detector means respectively connected to taps of said delay line for detecting a header information and supplying the detected header information to the interference cancelers of a corresponding one of said stages;
    a plurality of second delay elements for each of said cancellation stages, the second delay elements of each of the stages being connected together to a respective tap of said tapped delay line for introducing different amounts of delay to input signals of the interference cancelers of the associated stage; and
    summing means for summing interference replicas from the interference cancelers of said stages and applying a plurality of canceling signals to said interference cancelers.

6. A direct-sequence code division multiple access receiver as claimed in claim 1, wherein the interference cancelers of an earliest one of said cancellation stages are connected in series to said framing means, each of said cancellation stages comprises:
    a plurality of header detector means respectively connected to the interference cancelers of said each cancellation stage;
    a plurality of delay elements for providing delays to interference replicas from the interference cancellers of said each cancellation stage; and
    a plurality of adders for summing the delayed interference replicas with channel signals respectively supplied to the interference cancelers of a stage following said each cancellation stage.

7. A direct-sequence code division multiple access receiver comprising:

framing means for receiving a spread spectrum signal from a plurality of user channels, and segmenting the received spread spectrum signal into data blocks;

a plurality of power detectors connected in series from said framing means for determining power levels of said user channels, and appending a header to each of the data blocks containing indications of said power levels arranged in a predetermined order of channel numbers identifying said user channels; and a plurality of serial interference cancellation stages, each of the cancellation stages including a plurality of interference cancellers arranged in descending order of ranks, each of said interference cancellers detecting one of said power level indications of said header corresponding to the rank of the interference canceler and detecting one of said channel numbers corresponding to the detected power level indication, and removing one or more interfering signals from an associated user channel by using a despreading code corresponding to the detected channel number.

8. A direct-sequence code division multiple access receiver as claimed in claim 7, further comprising a switch responsive to said header for connecting output signals of said cancellation stages to output terminals.

9. A direct-sequence code division multiple access receiver as claimed in claim 7, wherein each of said interference cancelers comprises:

a header detector for producing a command signal from a header information;

an interference replica estimator for estimating an interference replica from an input signal using a despreading code specified by said command signal;

a delay element for delaying said input signal by an interval corresponding to the time taken to produce said interference replica; and a subtractor for combining the interference replica with the delayed input signal, the output of the subtractor being connected to a following interference canceler.

10. A direct-sequence code division multiple access receiver as claimed in claim 7, wherein each of said cancellation stages comprises:

a plurality of channel detector means respectively connected to the interference cancelers of said each cancellation stage;

a plurality of delay elements for providing delays to interference replicas from the interference cancellers of said each cancellation stage; and a plurality of adders for summing the delayed interference replicas with channel signals respectively supplied to the interference cancelers of a stage following said each cancellation stage.

* * * * *